United States Patent
Bajikar

(10) Patent No.: US 6,897,805 B2
(45) Date of Patent: May 24, 2005

(54) METHOD AND APPARATUS FOR LOCATION BASED WIRELESS ROAMING BETWEEN COMMUNICATION NETWORKS

(75) Inventor: Sundeep M. Bajikar, Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/028,466

(22) Filed: Dec. 19, 2001

(65) Prior Publication Data

US 2003/0112178 A1 Jun. 19, 2003

(51) Int. Cl.⁷ .............................................. H04B 7/185
(52) U.S. Cl. ............................ 342/357.06; 342/357.01
(58) Field of Search ....................... 342/357.01, 357.02, 342/357.06, 357.08; 455/12.1, 13.2, 277.1

(56) References Cited

U.S. PATENT DOCUMENTS 6,038,664 A * 3/2000 Schumacher et al. .......... 713/2
6,154,461 A * 11/2000 Sturniolo et al. ........... 370/401
6,208,857 B1   3/2001 Agre et al.
2002/0058515 A1 * 5/2002 Holler et al. ................ 455/455

FOREIGN PATENT DOCUMENTS

FR        2 802 379 A1    12/1999
WO       WO 01/50788 A1    7/2001

* cited by examiner

*Primary Examiner*—Dao Phan
(74) *Attorney, Agent, or Firm*—Blakely, Sokoloff, Taylor & Zafman LLP

(57) ABSTRACT

According to one embodiment of the invention an apparatus is provided. The apparatus comprises a positioning mechanism to determine a position of the apparatus; a baseband module comprising a plurality of network interfaces each supporting a network communications protocol; a determining mechanism to determine which communications networks are operative at the position of the apparatus; a selection mechanism to select one of the operative communications networks; and a connection mechanism to seamlessly connect the apparatus to the selected communications network using one of the network interfaces.

25 Claims, 6 Drawing Sheets

METHOD AND APPARATUS FOR LOCATION BASED WIRELESS ROAMING BETWEEN COMMUNICATION NETWORKS

FIELD OF THE INVENTION

This invention relates to communication networks. In particular it relates to roaming between communication networks.

BACKGROUND

Today there is a wide variety of wireless network operators (carriers), each employing different communications protocols and technologies. Each network operator typically operates a network having a discrete coverage area such that when a user of a wireless communication device moves out of said coverage area, a connection with the network is dropped or lost. When this happens, in order to connect to another network, a user of the wireless communications device would have to consult network coverage maps providing information on which networks are available at the user's present geographic location and manually enter the necessary information into the wireless communications device to enable a connection with one of said available networks. This is a bothersome process.

DETAILED DESCRIPTION

The present invention discloses, according to one embodiment, an apparatus in the form of a wireless communications device which is able to determine its current global position and to seamlessly connect to an available network at its current global position without any user intervention.

Figure 1:
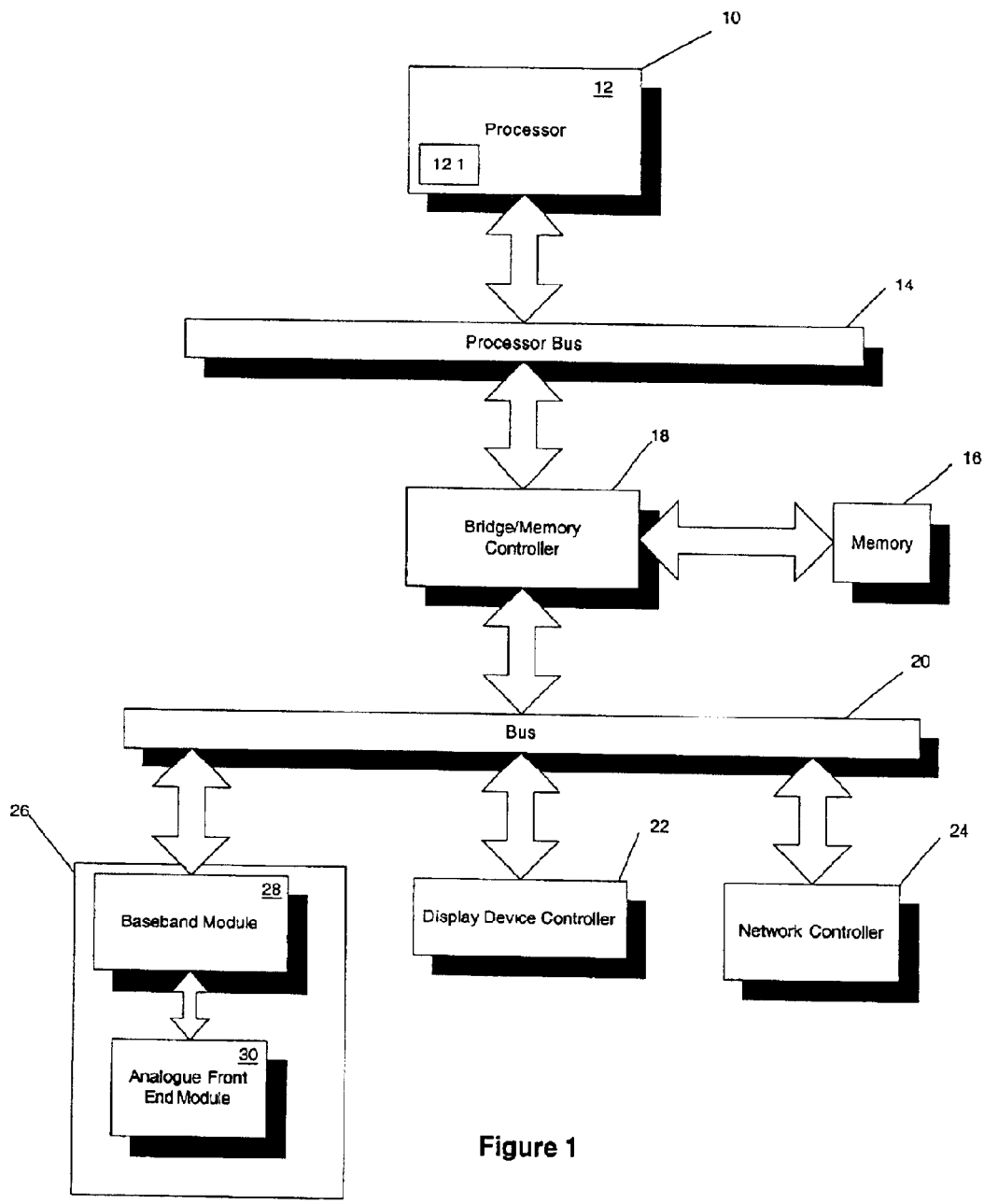
FIG. 1 shows a block diagram of a user device in accordance with the invention.

FIG. 1 of the drawings shows one embodiment of an apparatus in accordance with the invention. The apparatus 10 includes a processor 12 that processes data signals. Processor 12 may be a Complex Instruction Set Computer (CISC) microprocessor, a Reduced Instruction Set Computing (RISC) microprocessor, a Very Long Instruction Word (VLIW) microprocessor, a processor implementing a combination of instructions sets, or other processor device.

In one embodiment, processor 12 is a processor in the Pentium® family of processors including the Pentium® 4 family and mobile Pentium® processors available from Intel Corporation of Santa Clara, Calif. Alternatively, other processors may be used. FIG. 1 shows an example of an apparatus 10 employing a single processor. However, one of ordinary skill in the art will appreciate that apparatus 10 may be implemented using multiple processors.

Processor 12 is coupled to a processor bus 14. Processor bus 14 transmits data signals between processor 12 and other components in apparatus 10. Apparatus 10 also includes a memory 16. In one embodiment, memory 16 is a Dynamic Random Access Memory (DRAM) device. However, in other embodiments, memory 16 may be a Static Random Access Memory (SRAM) device, or other memory device.

Memory 16 may store instructions in code represented by data signals that may be executed by processor 12. According to one embodiment of the invention, a cache memory 12.1 resides within processor 12 and stores data signals that are also stored in memory 16. Cache 12.1 speeds up memory accesses by processor 12 by taking advantage of its proximity to processor 12. In another embodiment, cache 12.1 resides external to processor 12.

Apparatus 10 further includes a bridge memory controller 18 coupled to processor bus 14 and memory 16. Bridge/memory controller 18 directs data signals between processor 12, memory 16, and other components in apparatus 10 and bridges the data signals between processor bus 14, memory 16, and a first input/output (I/O) bus 20. In one embodiment, I/O bus 20 may be a single bus or a combination of multiple buses.

In a further embodiment, I/O bus 20 may be a Peripheral Component Interconnect adhering to a Specification Revision 2.1 bus developed by PCI Special Interest Group of Portland, Oreg. In another embodiment, I/O bus 20 may be a Personal Computer Memory Card International Association (PCMCIA) bus developed by PCMCIA of San Jose, Calif. Alternatively, other buses may be used to implement I/O bus 20. I/O bus 20 provides communication links between components in apparatus 10. A display device controller 22 is coupled to I/O bust 20. Display device controller 22 allows coupling of a displayed device to apparatus 10 and acts as an interface between the display device and apparatus 10. In one embodiment, display device controller 22 is a Monochrome Display Adapter (MDA) card. In other embodiments, display device controller 22 may be a Color Graphics Adapter (CGA) card, and Enhanced Graphics Adapter (EGA) card, and Extended Graphics Array (XGA) card or other display device controller. The display device receives data signals from processor 12 through display device controller 22 and displays information and data signals to a user of apparatus 10.

Figure 2:
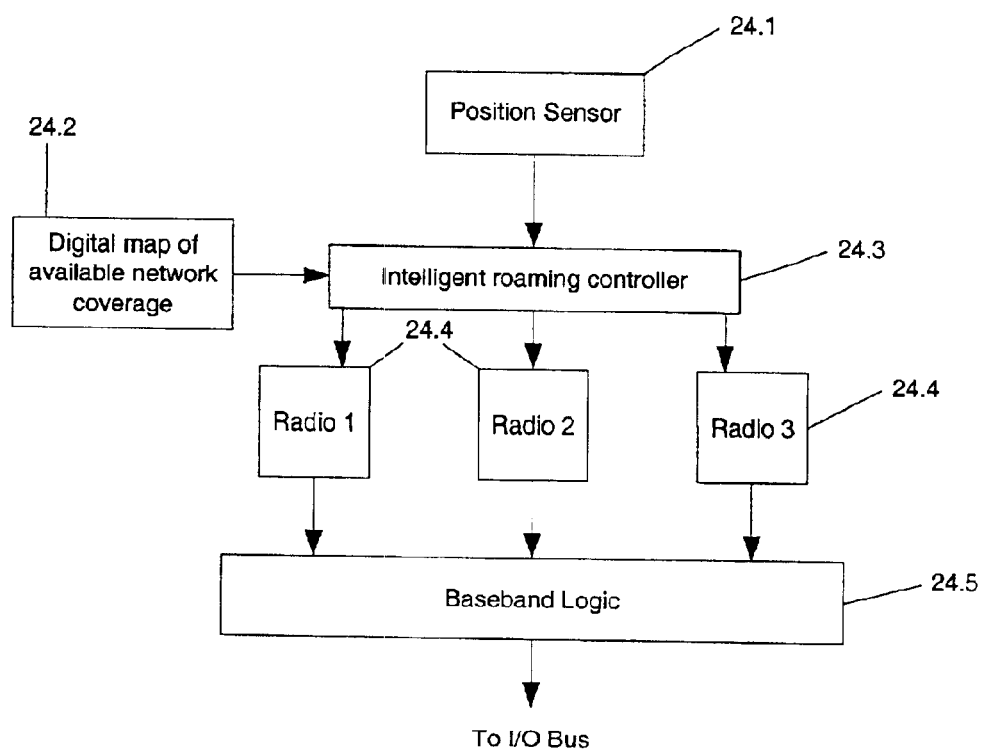
FIG. 2 shows a block diagram of the wireless communications module of the user device of FIG. 1 in greater detail.

Apparatus 10 includes a wireless communications module 24 which is coupled to I/O bus 20. Components of the wireless communications module 24 is shown in greater detail in FIG. 2 of the drawings. Referring to FIG. 2, it will be seen that the wireless communications module 24 includes a position sensor 24.1. The position sensor 24.1 may be any commercially available position sensor and in one embodiment it may be a GPS sensor. The module 24 further includes a digital map 24.2 which is an area coverage map indicating which communications networks are operative at a global position of apparatus 10. The module 24 further includes an intelligent roaming controller 24.3 which provides the functionality of selecting one of radio interfaces 24.4 to connect apparatus 10 to a selected operative communications network as will be described in greater detail below. Finally, the module 24 includes a baseband logic module 24.5. The detailed components within the baseband logic module 24.5 have not been shown however, one skilled in the art will understand that it will necessarily include components such as a digital signal processor, embedded controller support blocks such as volatile and non-volatile memory, clocks, interface logic and any miscellaneous hardware acceleration blocks required by the radio interfaces 24.4. The baseband logic module 24.5 is coupled to the I/O bus 20.

Figure 3:
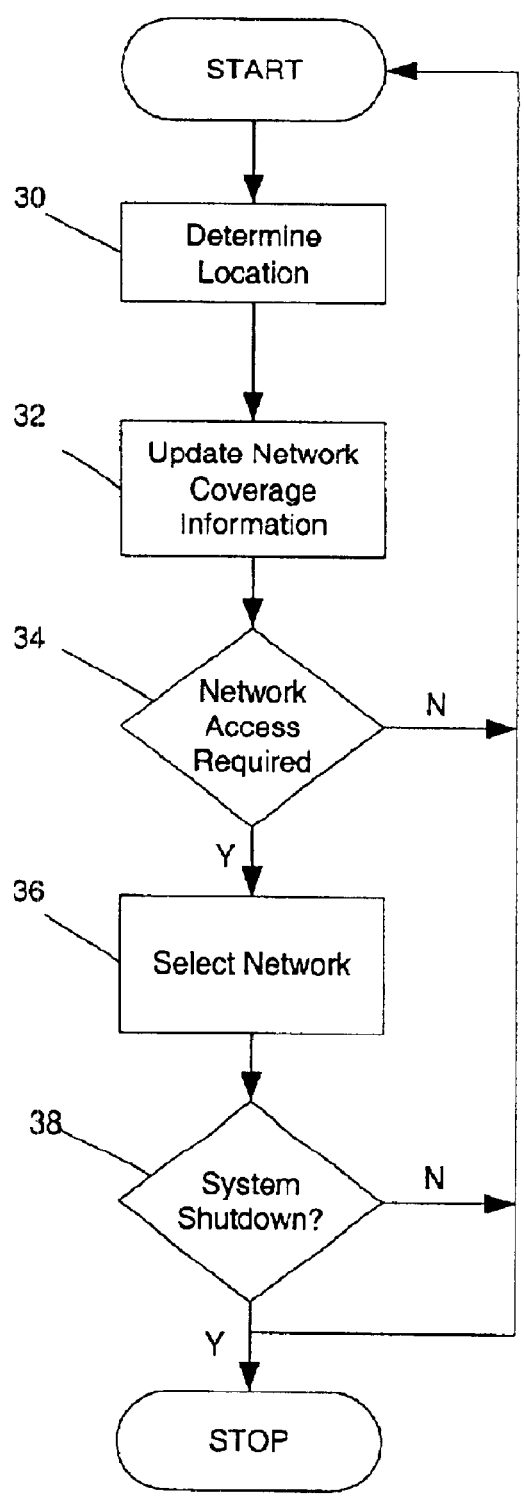
FIG. 3 shows a flowchart of operations performed in order to select a communication network in accordance with one embodiment of the invention.
Figure 4:
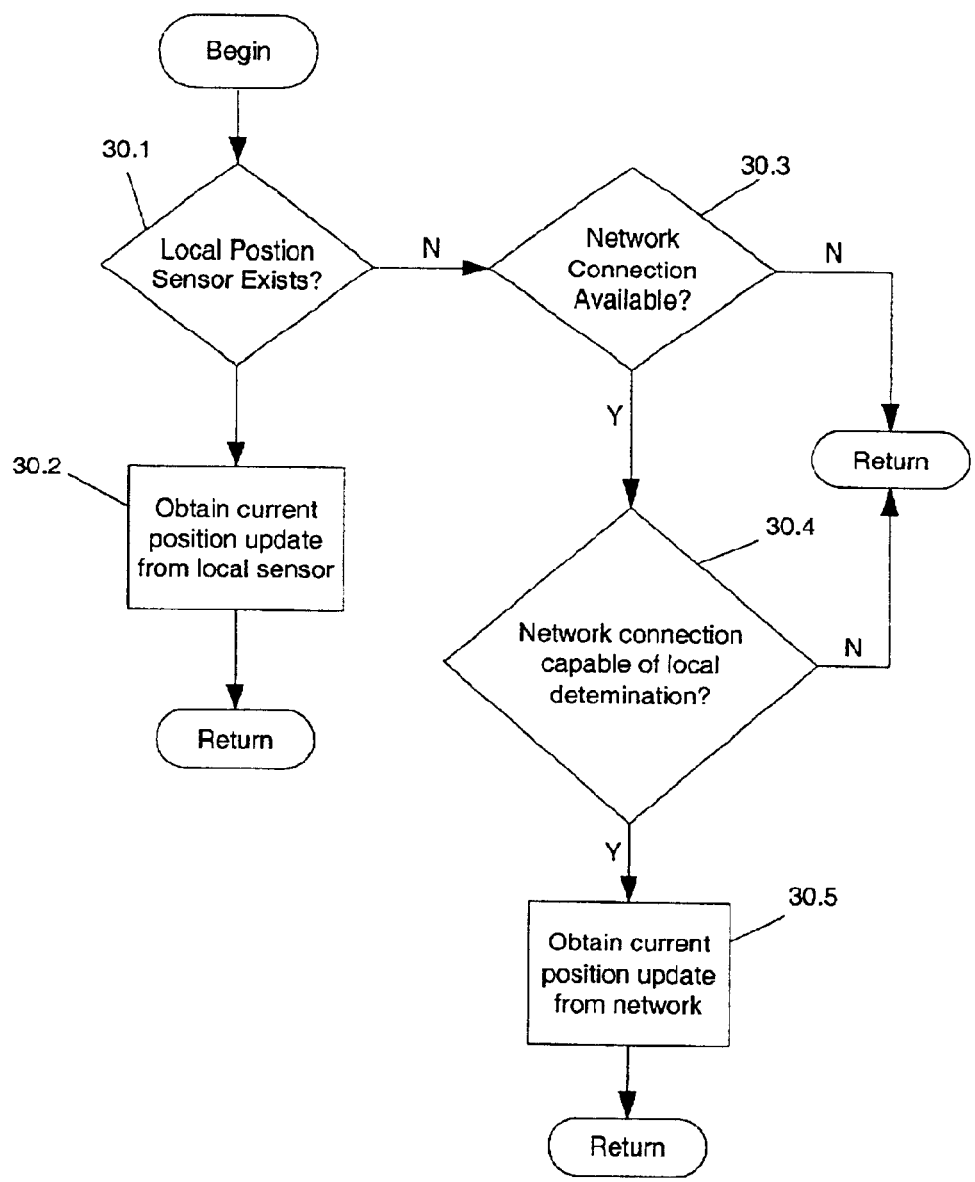
FIGS. 4, 5 and 6 show aspects of operations in FIG. 3 in greater detail.

The apparatus 10 may be used to perform operations shown in FIG. 3 of the drawings. Referring to FIG. 3 at block 30 the apparatus 10 determines its location relative to a locally defined coordinate system or a global coordinate system. The particular operations performed in order to determine the location of the apparatus at block 30 is shown in FIG. 4 of the drawings. Referring to FIG. 4, at block 30.1 a determination is made as to whether a local position sensor exists. If such a local sensor exists then at block 30.2 a current position of apparatus 10 is obtained from said local sensor. Alternatively, if no local sensor exists then at block 30.3 a determination is made as to whether a network connection is available. If a network connection is available then at block 30.4 a check is made to determine if the network connection is capable of determining the current position of apparatus 10. According to one embodiment, this may be achieved by accessing a database of services provided by a network operator for which services a current user of apparatus 10 is subscribed. If the network connection is capable of determining a current position of the apparatus 10 then at block 30.5 said current position is obtained from the network. Obtaining the current position involves sending a triangulation signal to the network operator, who would then triangulate the signal, and receiving said triangulated signal.

Figure 5:
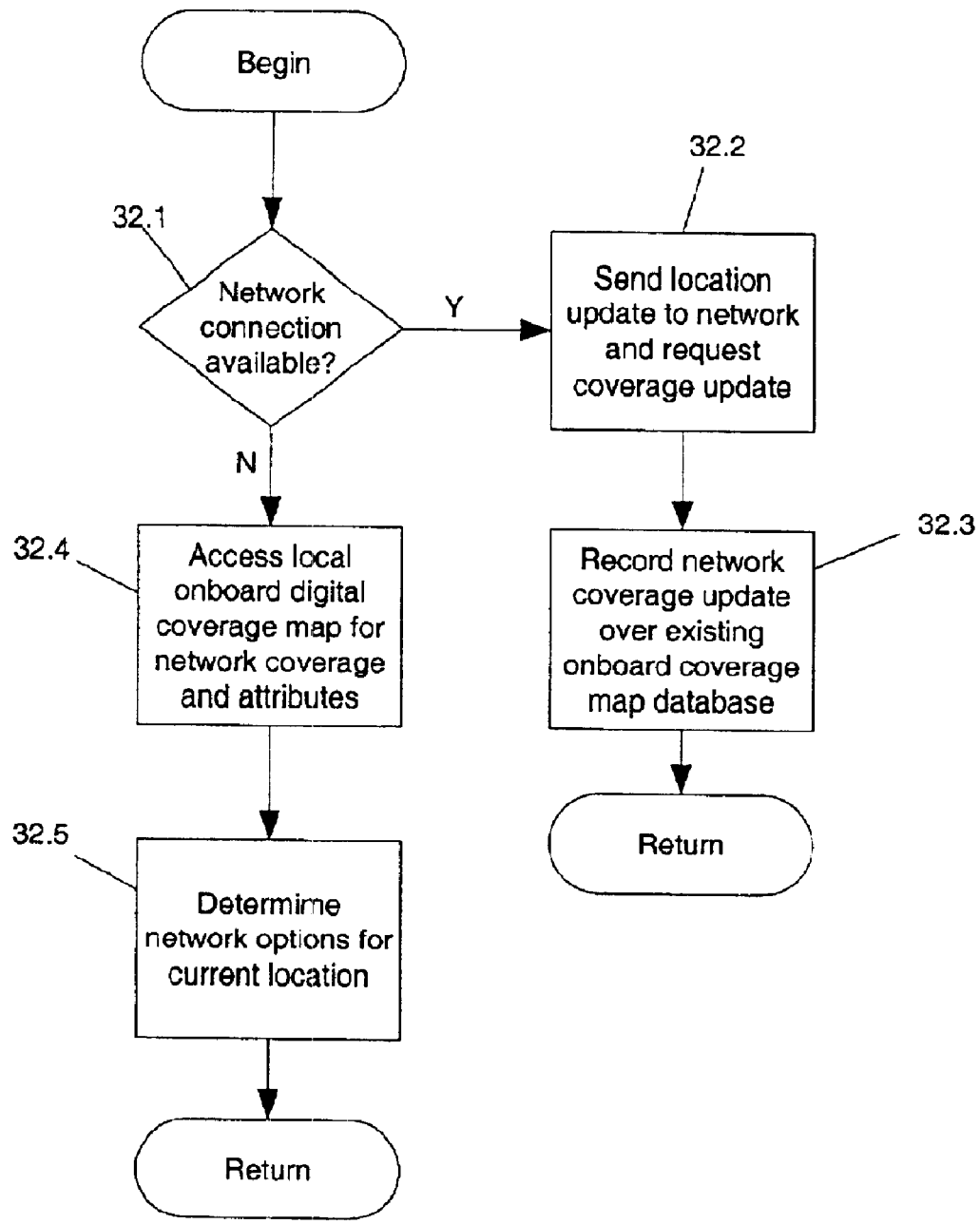

Referring again to FIG. 3 of the drawings, after the position/location of apparatus 10 has been determined at block 30, at block 32 an update is performed wherein network coverage information known to apparatus 10 is updated. The particular operations involved in performing such an updated at block 32 are shown in greater detail in FIG. 5 of the drawings. Referring to FIG. 5, at block 32.1 a determination is made as to whether a network connection is available. If a network connection is available then at block 32.2 a location update is sent to the network and a coverage update is requested. At 32.3 a coverage update is received and is recorded over an existing digital network coverage map stored locally on apparatus 10. If no network coverage is available then at block 32.4 the digital network coverage map is accessed to determine network coverage and attributes such as network bandwidth network service, and network billing rates. At block 32.5 the networks available for the current location is determined.

Figure 6:
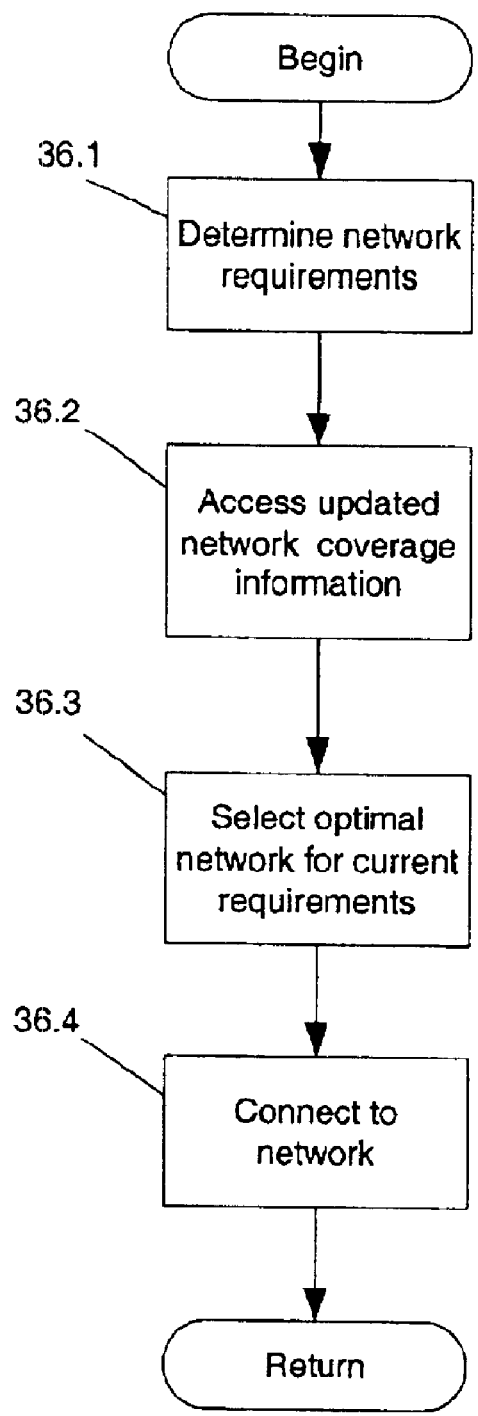

Referring again FIG. 3 of the drawings, at block 34 a determination is made as to whether network access is required. If no network access is required, then the operation at block 30 is performed again. If network access is required then at block 36 a select network operation is performed, the details of which are shown in FIG. 6 of the drawings. Referring to FIG. 6, at block 36.1 the particular network requirements are determined. At block 36.2 the updated network coverage information is accessed. At block 36.3 the optimal network for the current requirements is selected. At block 36.4 a connection to the selected network is established.

Referring to FIG. 3 of the drawings, at block 38 a determination is made as to whether a system shutdown request has been received. If no system shutdown has been received then block 30 is performed again. If a system has been received then operations shown in FIG. 3 of the drawings are terminated.

As an example of how the present invention may be advantageously employed, consider a mobile device being transported in a low power state, with the onboard location sensor turned on. The onboard digital network coverage map may be used to determine, for example, that the device has entered a zone which has access points to a particular radio network, say a IEEE 802.11 network. If there are outstanding user-scheduled network transactions, then the mobile device will automatically "wake up", its onboard IEEE 802.11 interface and it connects to the IEEE 802.11 network and processes pending network transactions without any user interference. An example of a pending network transaction is an email message composed in off-line mode and stored for transmission subject to network availability.

It will be appreciated that as a user moves around with the mobile device, the position sensor keeps track of where the mobile device is at any given time with reference to the onboard digital network coverage map. When the mobile device enters a zone with network coverage (according to the onboard digital coverage map), the appropriate radio interface is powered up to establish a network connection. Similarly, when the mobile device transitions from a zone with one type of network coverage the zone with another type of network coverage, the onboard location sensor determines which interface to turn on, and which to power down. Accordingly, one aspect of the invention involves managing the power consumption of those network interfaces, which are not currently being used by selectively turning them on or off based on the particular network available at the current position of the apparatus.

A further advantage of the present invention is that it allows a consumer to seamlessly switch between networks based on location, without having to manually input authentication information in order to connect to a different network. Typically, such authentication information includes user identification information, billing information, etc. A significant advantage of the present invention is that such authentication information is stored in the apparatus 10 and is provided to a network with which a connection is required.

For the purposes of this specification, a machine-readable medium includes any mechanism that provides (i.e. stores and/or transmits) information in a form readable by a machine (e.g. computer) for example, a machine-readable medium includes read-only memory (ROM); random access memory (RAM); magnetic disk storage media; optical storage media; flash memory devices; electrical, optical, acoustical or other form of propagated signals (e.g. carrier waves, infra red signals, digital signals, etc.); etc.

It will be apparent from this description the aspects of the present invention may be embodied, at least partly, in software. In other embodiments, hardware circuitry may be used in combination with software instructions to implement the present invention. Thus, the techniques are not limited to any specific combination of hardware circuitry and software.

Although the present invention has been described with reference to specific exemplary embodiments, it will be evident that the various modification and changes can be made to these embodiments without departing from the broader spirit of the invention as set forth in the claims. Accordingly, the specification and drawings are to be regarded in an illustrative sense rather than in a restrictive sense. In this regard, it will be understood that apparatus may be any wireless device such as a mobile telephone, Personal Digital Assistant (PDA), notebook computer or pocket PC.

What is claimed is:

1. Apparatus comprising:
    a positioning mechanism to determine a position of said apparatus;
    a baseband module including a plurality of network interfaces each supporting a network communications protocol;
    a determining mechanism to determine which communications networks are operative at said position;

a selection mechanism to select one of said operative communications networks;

a connection mechanism to seamlessly connect said apparatus to said selected communications network using one of said network interfaces; and a mechanism to manage a power consumption of the network interfaces not selected.

2. The apparatus of claim 1, wherein the positioning mechanism comprises a positioning sensor.

3. The apparatus of claim 2, wherein the positioning sensor comprises a Global Positioning Satellite (GPS) sensor.

4. The apparatus of claim 1, wherein the positioning mechanism transmits a triangulation signal which is triangulated by a network operator, the apparatus then operating to receive a result of said triangulation.

5. The apparatus of claim 1, wherein the determining mechanism determines the operative communications networks using an area coverage map indicating the communications networks operative at said position.

6. The apparatus of claim 5, wherein said area coverage map comprises operational information about said operative communications networks.

7. The apparatus of claim 5, wherein said area coverage map is stored locally in a memory device included in said apparatus.

8. The apparatus of claim 1, wherein said selection mechanism selects said operative communications network based on user-defined criteria.

9. The apparatus of claim 8, wherein the user-defined criteria is selected from a group comprising of a network bandwidth, network services and network billing rates.

10. A method comprising:

determining a position of a user device;

determining which communications networks are operative at said position using a digital map indicating a coverage area for each communications network;

selecting one of said operative networks;

connecting said user device seamlessly to said selected network; and managing a power consumption of network interfaces to the operative networks not selected.

11. The method of claim 10, wherein determining said position is performed by transmitting a triangulation signal from said user device, which signal is triangulated by a network operator; and receiving a result of said triangulation.

12. The method of claim 10, wherein determining said position is achieved using a positioning sensor which forms part of said user device.

13. The method of claim 10, wherein said digital map is stored in a memory device forming a part of said user device.

14. The method of claim 10, wherein selecting one of said operative networks is based on user-defined criteria.

15. The method of claim 14, wherein said user-defined criteria is selected from a group comprising of a network bandwidth, network services and network billing rates.

16. A computer-readable storage medium having stored therein a sequence of instructions which when executed by a processor cause said processor to perform operations comprising:

determining a position of a user device;

determining which communications networks are operative at said position;

selecting one of said operative communications networks;

connecting said device seamlessly to the selected network; and managing a power consumption of network interfaces to the operative networks not selected.

17. The computer-readable storage medium of claim 16, wherein determining said position is performed by transmitting a triangulation signal from said device, which signal is triangulated by a network carrier; and receiving a result of said triangulation.

18. The computer-readable storage medium of claim 16, wherein determining said position is achieved using a positioning sensor which forms a part of said user device.

19. The computer-readable storage medium of claim 16, wherein determining which communications networks are operative at said position comprises using a digital map indicating coverage area for the communications networks.

20. The computer-readable storage medium of claim 19, wherein said digital, map is stored in a memory device forming a part of said user device.

21. The computer readable storage medium of claim 16, wherein selecting one of said operative networks is based on user defined criteria.

22. The computer-readable storage medium of claim 23, wherein said user defined criteria is selected from a group comprising of a network bandwidth, network services and network billing rates.

23. Apparatus comprising:

positioning means for determining a position of said apparatus;

communication means including a plurality of network interfaces each supporting a network communications protocol;

determining means for determining which communications networks are operative at said position;

selection means for selecting one of said operative communications networks;

connection means for seamlessly connecting said apparatus to said selected communications network using one of said network interfaces; and power management means for managing a power consumption of network interfaces to the operative communications networks not selected.

24. The apparatus of claim 23, wherein the positioning means comprises a positioning sensor.

25. The apparatus of claim 24, wherein said positioning sensor comprises a Global Positioning Satellite (GPS) sensor.

* * * * *